US010860169B2

(12) United States Patent
Cricrì et al.

(10) Patent No.: US 10,860,169 B2
(45) Date of Patent: Dec. 8, 2020

(54) METHOD, APPARATUS OR COMPUTER PROGRAM FOR USER CONTROL OF ACCESS TO DISPLAYED CONTENT

(71) Applicant: Nokia Technologies Oy, Espoo (FI)

(72) Inventors: Francesco Cricrì, Tampere (FI); Arto Lehtiniemi, Lempäälä (FI); Antti Eronen, Tampere (FI); Jussi Leppänen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 71 days.

(21) Appl. No.: 16/094,260

(22) PCT Filed: Apr. 27, 2017

(86) PCT No.: PCT/FI2017/050319
§ 371 (c)(1),
(2) Date: Oct. 17, 2018

(87) PCT Pub. No.: WO2017/187019
PCT Pub. Date: Nov. 2, 2017

(65) Prior Publication Data
US 2019/0129598 A1    May 2, 2019

(30) Foreign Application Priority Data
Apr. 29, 2016  (EP) .................................... 16167586

(51) Int. Cl.
*G06F 3/048*     (2013.01)
*G06F 3/0481*    (2013.01)
(Continued)

(52) U.S. Cl.
CPC .......... *G06F 3/04815* (2013.01); *G06F 3/011* (2013.01); *G06F 3/012* (2013.01);
(Continued)

(58) Field of Classification Search
CPC ...... G06F 3/04815; G06F 3/011; G06F 3/012; G06F 3/013; G06F 3/01; G06F 3/04842; G06F 3/04845
See application file for complete search history.

(56) References Cited

U.S. PATENT DOCUMENTS

2006/0125845 A1   6/2006  Takeuchi et al.
2012/0266109 A1*  10/2012 Lim ...................... G06F 3/0485
                                                        715/863
(Continued)

OTHER PUBLICATIONS

"Leap Motion Interaction Engine in VR", YouTube, Retrieved on Oct. 12, 2018, Webpage available at : https://www.youtube.com/watch?v=2W9x3zmKS_w.

(Continued)

*Primary Examiner* — David E Choi
(74) *Attorney, Agent, or Firm* — Barrington & Smith

(57) ABSTRACT

A method comprising: causing definition of a display window in a displayed virtual scene; displaying window content inside the display window, in the displayed virtual scene; in dependence upon a first user action, causing a first change in the window content displayed inside the display window to first window content different to the window content, without changing the display window; and in dependence upon a second user action causing a second change in the window content displayed in the display window to second window content, different to the first window content and the window content, and causing a variation in the display window to become a modified display window different to the display window.

20 Claims, 3 Drawing Sheets

(51) Int. Cl.
*G06F 3/01* (2006.01)
*G06F 3/0484* (2013.01)

(52) U.S. Cl.
CPC .............. *G06F 3/013* (2013.01); *G06F 3/017* (2013.01); *G06F 3/04842* (2013.01); *G06F 3/04845* (2013.01); *G06F 2203/04806* (2013.01)

(56) References Cited

U.S. PATENT DOCUMENTS

| | | | | |
|---|---|---|---|---|
| 2013/0047119 | A1* | 2/2013 | Lee ..................... | G06F 3/04883 715/800 |
| 2015/0277699 | A1* | 10/2015 | Algreatly ............ | G06F 3/04815 715/850 |
| 2015/0325052 | A1* | 11/2015 | Kuehne ................ | G06T 19/006 345/633 |
| 2016/0094889 | A1* | 3/2016 | Venkataraman ... | H04N 21/4828 725/53 |
| 2017/0262458 | A1* | 9/2017 | Kodam ............... | H04L 65/4084 |
| 2018/0033204 | A1* | 2/2018 | Dimitrov ................ | G06T 15/20 |
| 2019/0129598 | A1* | 5/2019 | Cricr ....................... | G06F 3/011 |

OTHER PUBLICATIONS

"Smart Vision—Interactive Augmented Reality, Hand Tracking using Kinects SAP HANA, NetWeaver Cloud", YouTube, Retrieved on Oct. 12, 2018, Webpage available at : https://www.youtube.com/watch?v=8FggsGUK5iA.

Extended European Search Report received for corresponding European Patent Application No. 16167586.3, dated Oct. 28, 2016, 8 pages.

"How to make Google Cardboard: Turn any phone into a VR headset", TechAdvisor, Retrieved on Oct. 8, 2018, Webpage available at : http://www.pcadvisor.co.uk/how-to/gadget/how-make-googlecardboard-vr- headset - v2-3585298/.

"How to Zoom Thumbnail Images on Hover", Envira Gallery, Retrieved on Oct. 8, 2018, Webpage available at http://enviragallery.com/docs/how-to-zoom-thumbnail-images-on-hover/.

International Search Report and Written Opinion received for corresponding Patent Cooperation Treaty Application No. PCT/FI2017/050319, dated Jul. 11, 2017, 14 pages.

Office action received for corresponding European Patent Application No. 16167586.3, dated Feb. 6, 2020, 10 pages.

"YouTube.com Picture in Picture Demo", YouTube, Retrieved on Feb. 18, 2020, Webpage available at : https://www.youtube.com/watch?v=s8H4c778CKg&feature=emb_title.

"YouTube Video Preview—Chrome Extension (2011)", YouTube, Retrieved on Feb. 18, 2020, Webpage available at : https://www.youtube.com/watch?v=qQhBrJGsLkE.

"How to use Cardboard Reticle: VR Gaze Pointer/Cursor, Cardboard Button, & Gaze Input", YouTube, Retrieved on Feb. 18, 2020, Webpage available at : https://www.youtube.com/watch?v=_YTVsLnK-XU.

* cited by examiner

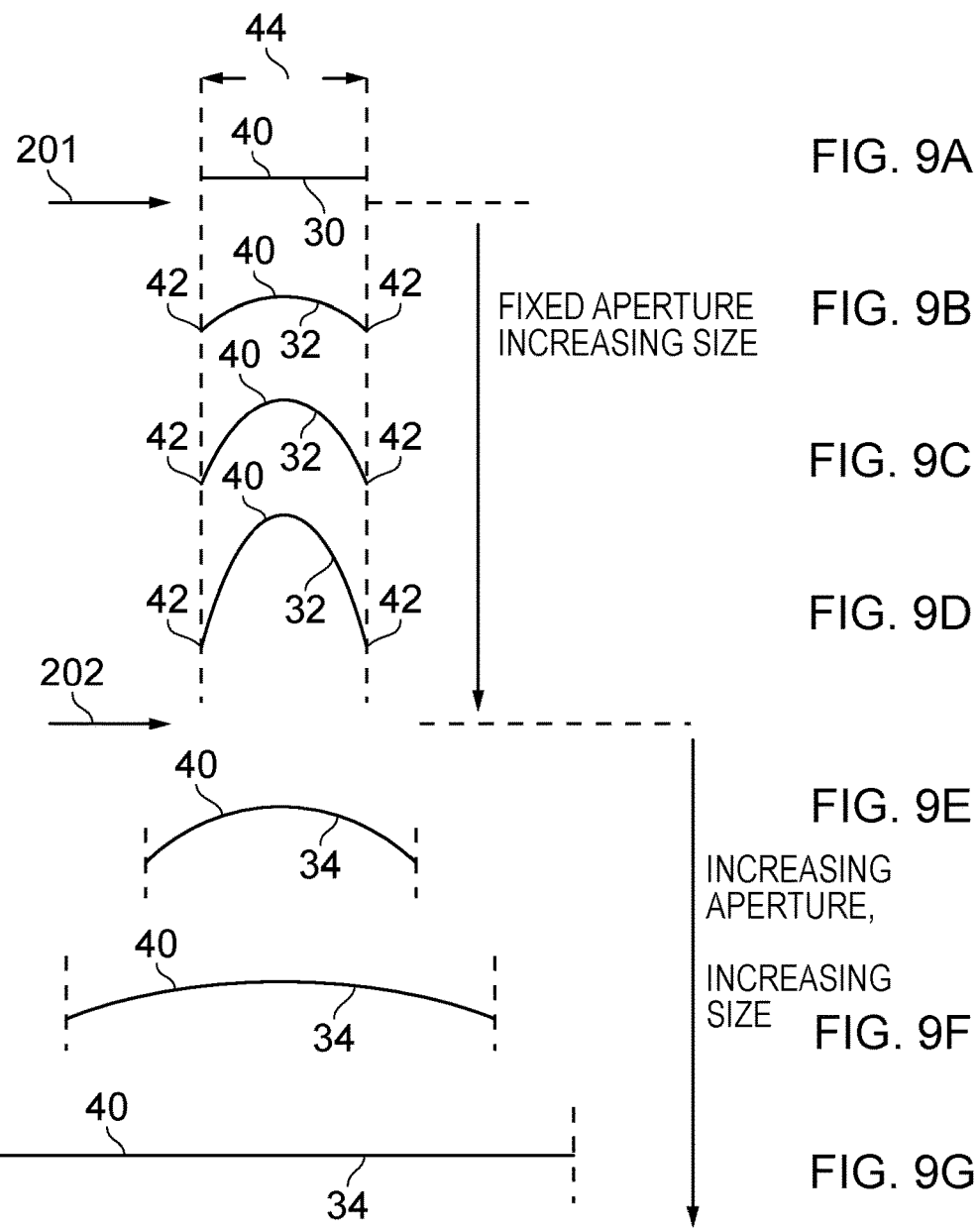
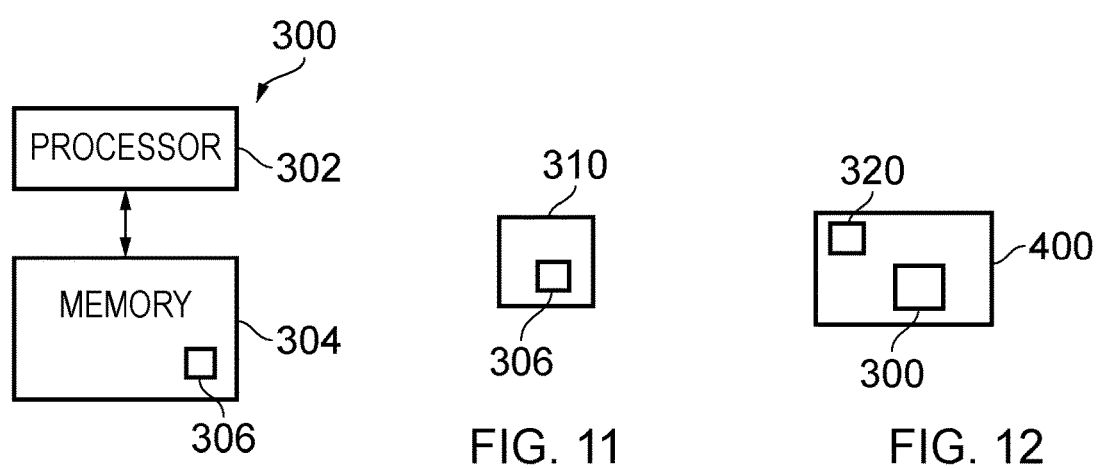

METHOD, APPARATUS OR COMPUTER PROGRAM FOR USER CONTROL OF ACCESS TO DISPLAYED CONTENT

RELATED APPLICATION

This application was originally filed as Patent Cooperation Treaty Application No. PCT/FI2017/050319 filed Apr. 27, 2017 which claims priority benefit to EP Patent Application No. 16167586.3, filed Apr. 29, 2016.

TECHNOLOGICAL FIELD

Embodiments of the present invention relate to methods, apparatus and computer programs for user control of access to displayed content.

BACKGROUND

It is desirable to enable a user to be able to find and window content that they find of interest.

Different solutions to this problem exist. For example, in the internet, content may be tagged using metadata and the content may be indexed by a search engine. A search using keywords that correspond with or are similar to the indexed items may result in the return of the indexed content. Another approach is to identify content using a user-defined title or using a thumbnail representing the content in a graphical user interface.

While these approaches are useful and have some advantages, they also suffer from some limitations. It would therefore be desirable to provide for different user control of access to displayed content.

BRIEF SUMMARY

According to various, but not necessarily all, embodiments of the invention there is provided examples as claimed in the appended claims.

According to various, but not necessarily all, embodiments of the invention there is provided a method comprising: causing definition of a display window in a displayed virtual scene; displaying window content inside the display window, in the displayed virtual scene; in dependence upon a first user action, causing a first change in the window content displayed inside the display window to first window content different to the window content, without changing the display window; and in dependence upon a second user action causing a second change in the window content displayed in the display window to second window content, different to the first window content and the window content, and causing a variation in the display window to become a modified display window different to the display window.

In some but not necessarily all examples, the window content displayed in the display window is a representation of virtual reality enabled content accessible for playback via at least the second user action.

In some but not necessarily all examples, the first window content displayed in the display window is a representation of the virtual reality enabled content accessible via the second user action. In some but not necessarily all examples, the first window content displayed in the display window is a representation of the virtual reality enabled content immediately accessible via the second user action.

In some but not necessarily all examples, the first window content is dependent upon the first user action.

In some but not necessarily all examples, the first window content is a distortion of content comprising the window content so that content in addition to the window content is viewed within the display window without variation to a size or resolution of the display window. In some but not necessarily all examples, the distortion is applied only horizontally and not vertically. In some but not necessarily all examples, the distortion is provided horizontally in dependence upon the intensity of the first user action.

In some but not necessarily all examples, the second window content displayed in the modified display window is virtual reality enabled content. In some but not necessarily all examples, the window content is a portion of the virtual reality enabled content displayed in the modified display window, the first window content includes the window content and the second window content includes the first window content.

In some but not necessarily all examples, content is rendered into the display window to represent the display window as a substantially flat or gently curved projection surface displaying the window content and wherein the first window content is rendered into the display window to represent the display window as a curved projection surface displaying the first window content. In some but not necessarily all examples, a curvature of the curved projection surface displaying the first window content is dependent upon the first user action.

In some but not necessarily all examples, the content displayed in the display window is a portion of virtual reality enabled content, the portion having a limited field of view in a horizontal direction and a vertical direction. In some but not necessarily all examples, the first window content displayed in the display window is a first portion of the virtual reality enabled content, the first portion having a limited first field of view in a horizontal direction and a vertical direction, wherein the first field of view is greater than the field of view.

In some but not necessarily all examples, the content displayed in the display window is a cropped portion of virtual reality enabled content at a same scale at which the virtual reality enabled content is displayed. In some but not necessarily all examples, the first window content displayed in the display window is a first cropped portion of virtual reality enabled content at a same scale at which the virtual reality enabled content is displayed that has been distorted to fit in the display window. In some but not necessarily all examples, the distortion of the first cropped portion of virtual reality enabled content is dependent upon the first user action.

In some but not necessarily all examples, the first user action is a user gesture or input via a user control device.

In some but not necessarily all examples, the second user action comprises a user watching the display window.

In some but not necessarily all examples, the second change in content in response to the second user action comprises undoing the first change in content that occurred as a result of the first user action and performing a new, different, change in content, wherein the second change in content comprises continually increasing a size of the modified display window while maintaining the same resolution of virtual reality enabled content displayed in the modified display window, such that a portion of the virtual reality enabled content that has an increasing field of view is displayed.

In some but not necessarily all examples, in response to user action, content displayed in the display window is panned.

In some but not necessarily all examples, the method further comprises defining a plurality of display windows distributed at different orientations in a virtual space such that different virtual scenes comprise combinations of one or more different display windows, the method comprising:

displaying different window content inside the different display windows, in a displayed virtual scene;

in dependence upon a first user action, selecting one of the different display windows in the displayed virtual scene and causing a first change in the window content displayed inside the selected display window to first window content different to the window content, without changing the selected display window; and in dependence upon a second user action causing a second change in the window content displayed in the selected display window to second window content, different to the first window content and the window content, and causing a variation in the selected display window to become a modified display window different to the display window.

According to various, but not necessarily all, embodiments of the invention there is provided a method comprising:

during a browsing mode, detecting orientation of the user so that a virtual scene is changed to comprise a display window comprising content representing virtual reality enabled content;

in response to a first user action, entering a preview mode during which a portion of the virtual reality enabled content is previewed in the display window;

in response to a second user action, entering a playback mode in which the virtual reality content is played;

wherein in the preview mode, in response to the first user action, the display window is not re-sized and is kept at the same location while increasingly larger portions of the virtual reality enabled content are previewed in the display window.

In some but not necessarily all examples, the method comprises warping or distorting the content so that it appears displayed upon a warped or curved surface. In some examples, the method is used to enable increasingly larger portions of the virtual reality enabled content to be previewed in the display window.

According to various, but not necessarily all, embodiments of the invention there is provided an apparatus comprising: at least one processor; and at least one memory including computer program code the at least one memory and the computer program code configured to, with the at least one processor, cause the apparatus at least to perform: causing definition of a display window in a displayed virtual scene;

displaying window content inside the display window, in the displayed virtual scene; in dependence upon a first user action, causing a first change in the window content displayed inside the display window to first window content different to the window content, without changing the display window; and in dependence upon a second user action causing a second change in the window content displayed in the display window to second window content, different to the first window content and the window content, and causing a variation in the display window to become a modified display window different to the display window.

BRIEF DESCRIPTION

For a better understanding of various examples that are useful for understanding the detailed description, reference will now be made by way of example only to the accompanying drawings in which:

FIGS. 9A to 9G illustrate how a projection surface may be used to modify rendering of the first window content within the display window and to modify rendering of the second window content within the modified display window;

FIG. 10 illustrates an example of a controller;

FIG. 11 illustrates an example of a delivery mechanism; and

FIG. 12 illustrates an example of an apparatus.

DETAILED DESCRIPTION

The examples described below allow a user to browse, preview and playback content according to a new paradigm that may be particularly advantageous when browsing, previewing and playback occur using virtual reality.

Figure 1A:
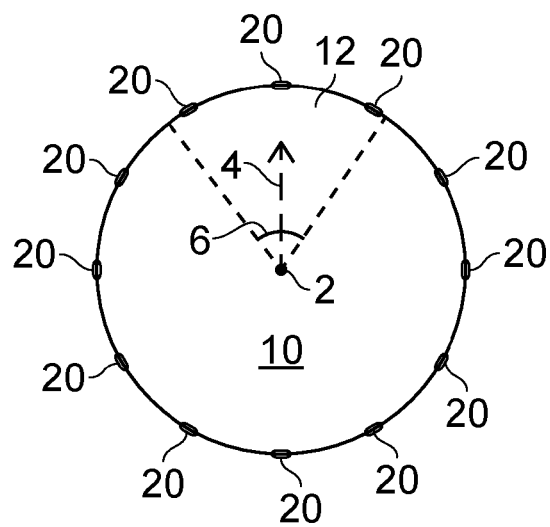
FIGS. 1A and 1B illustrate an example of a virtual space viewed by a user at different orientation.
Figure 1B:
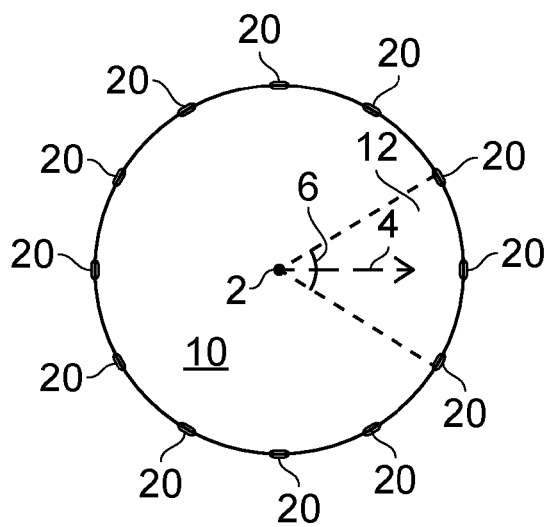

FIGS. 1A and 1B illustrate an example embodiment of a virtual space 10 that may be viewed by a user 2. The user 2 is able to view different parts of the virtual space 10, as virtual scenes 12, by changing an orientation 4 of the user 2. The user 2 has a field of view 6 that is centered upon the orientation 4 of the user. That portion of the virtual space 10 that falls within the field of view 6 defines the virtual scene 12.

In some examples, the virtual space is fully three dimensional and an orientation of a user is for example a three dimensional bearing, for example, defined by a azimuthal angle and polar angle in spherical coordinates. The azimuthal angle may be within any defined range with limits between 0° and 360°. The polar angle may be within any defined range with limits between 0° and 180°

In some examples, the virtual space is partially three dimensional and an orientation of a user is for example a two dimensional bearing, for example, defined by an azimuthal angle in spherical coordinates. The azimuthal angle may be within any defined range with limits between 0° and 360°.

In the example of FIGS. 1A and 1B, the virtual space 10 comprises a plurality of display windows 20 that are distributed throughout the virtual space at different orientations from the user 2. As the user 2 changes their orientation 4, the location of the field of view 6 changes and different ones of the display windows 20 are displayed as part of the virtual scene 12.

FIG. 1B illustrates the same virtual space as illustrated in FIG. 1A. However, in FIG. 1B, the user 2 has a different orientation 4 and the same field of view 6. The virtual scene 12 is therefore of the same size as in FIG. 1A but it includes a different portion of the virtual space 10 and includes within it different ones of the display windows 20.

It should be appreciated that although FIGS. 1A and 1B illustrates a horizontal cross-section through the virtual space 10, the virtual space is not necessarily two dimensional but may be three dimensional and the orientation of the user 2 may be defined by not only an azimuthal angle as illustrated in FIGS. 1A and 1B but also a polar angle (not illustrated) allowing the user 2 to be orientated in three dimensional space. It should be appreciated that the content of the virtual scene 12 may be independent of content displayed in the display windows 20.

Figure 2:
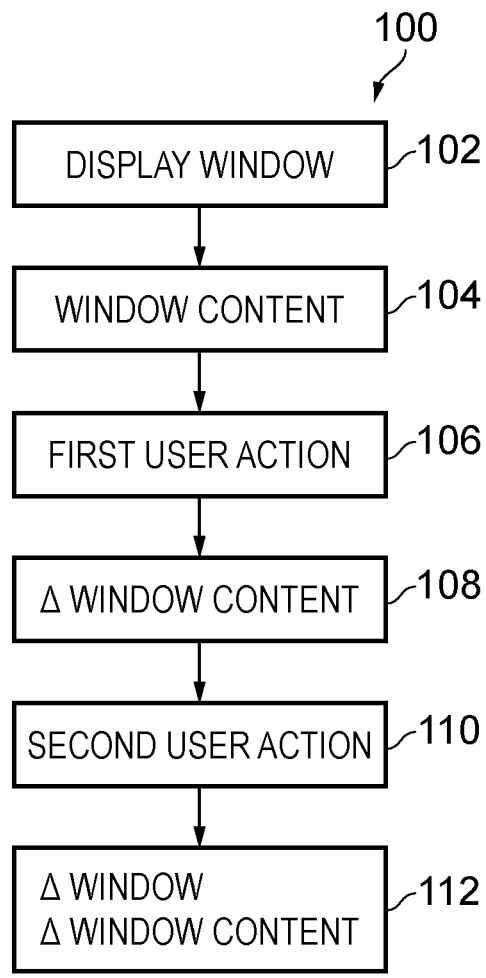
FIG. 2 illustrates an example of a method for controlling display of content in response to user action.

FIG. 2 illustrates an example of a method 100 for controlling display of content in response to user action.

At block 102, the method 100 comprises causing definition of a display window 20 in a displayed virtual scene 12.

Figure 3A:
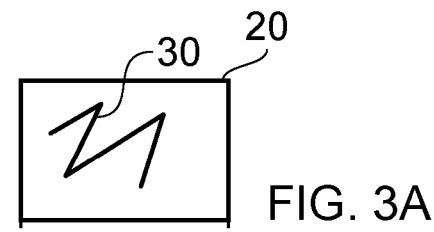
FIG. 3A illustrates a display window displaying window content.

Then, at block 104, the method 100 comprises displaying window content 30 directly inside the display window 20, which is located in the displayed virtual scene 12. FIG. 3A illustrates an example of a display window 20 displaying window content 30.

Then, at block 106, the method 100 comprises detecting a first user action.

Figure 3B:
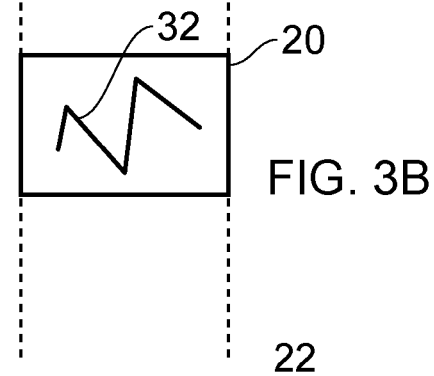
FIG. 3B illustrates the same display window displaying different content, the first window content.

Then, at block 108, the method 100 comprises, in dependence upon the first user action, causing a first change in the window content displayed inside the display window 20 to first window content 32 different to the window content 30, without changing the display window 20. FIG. 3B illustrates an example of a display window 20, comprising the first window content 32.

Then, at block 110, the method 100 comprises detecting a second user action.

Figure 3C:
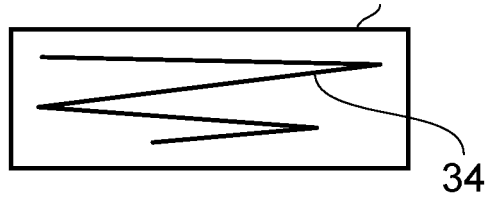
FIG. 3C illustrates a different display window, the modified display window, displaying second window content.

Then, at block 112, the method 100 comprises, in dependence upon the second user action, causing a second change in the window content displayed in the display window to second window content 34 different to the first window content 32 and the window content 30, and causing a variation in the display window to become a modified display window 22, different to display window 20. The modified display window 22 displays the second window content 34. FIG. 3C illustrates an example of a modified display window 22 displaying second window content 34. The first user action and the second user action may be similar or different. The first user action and the second user action may occur at different times, for example, the first user action may precede the second user action (the second user action is later than the first user action).

Where the first user action and the second user action occur at different times they may be referred to as 'distinct' or differentiable by timing. In some but not necessarily all examples, the first user action and the second user action are distinct.

Where the first user action and the second user action are different actions, whether or not they occur at different times, they may be referred to as 'different' or differentiable by action. In some but not necessarily all examples, the first user action and the second user action are different. In some but not necessarily all examples, the first user action and the second user action are distinct and different.

Where the first user action and the second user action are the same or similar actions, whether or not they occur at different times, they may be referred to as 'same' or 'similar'. In some but not necessarily all examples, the first user action and the second user action are the same or similar. In some but not necessarily all examples, the first user action and the second user action are the same or similar and also distinct. For example, the same gesture may be performed at different times for the first user action and for the second user action.

In the examples of FIGS. 3A, 3B and 3C, the display window 20 and the modified display window 22 have the same fixed pixel resolution. Although in the examples illustrated, the display window 20 and the modified display window 22 are rectangular this is not necessary. The display window 20 may, for example, be of any suitable shape. It may, for example, be circular or square.

FIG. 3A illustrates an example display window 20 displaying window content 30. FIG. 3B illustrates the same display window 20 displaying different content, the first window content 32. It should be appreciated that the display window 20 in FIG. 3A and the display window 20 in FIG. 3B are the same. They are at the same location, they have the same size, they have the same shape and they have the same pixel resolution.

FIG. 3C illustrates a different display window, the modified display window 22. This modified display window 22 has a greater size (area) than the display window 20. In this example, the centre of the modified display window 22 is positioned at the same location as a centre of the display window 20 illustrated in FIGS. 3A and 3B.

In this example, the modified display window 22 has a greater width than the display window 20. However, in other examples it may additionally or alternatively have a greater height or if the display window is circular the modified display window may have a greater radius than the display window 20.

The display window 20 illustrated in FIG. 3B displays different content to that displayed in the display window 20 of FIG. 3A. The display window 20 of FIG. 3B displays first window content 32. The display of the first window content 32 is caused by the first user action. Additionally, the first window content 32 may be dependent upon the first user action. That is, depending upon the characteristics of the first user action the content of the first window content 32 may vary. Therefore, although any appropriate first user action will cause a change in the window content to first window content 32 without changing the display window 20, the exact nature of the change in the window content will depend upon the exact nature of the first user action.

Figure 4:
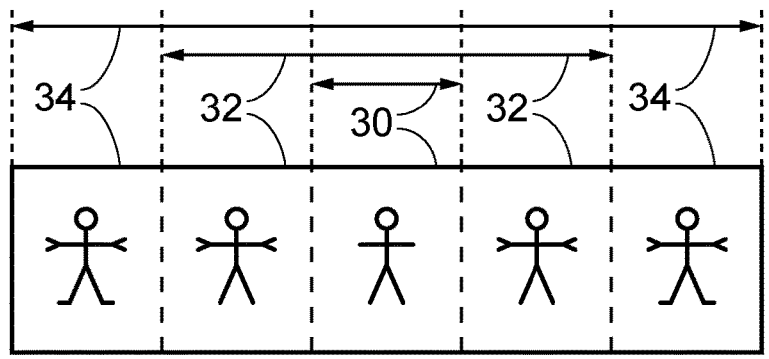
FIG. 4 illustrates that a different sub-set of the same content may be used for the window content, first window content and second window content.

FIG. 4 illustrates different examples of window content illustrated with a flat projection.

In the example of FIG. 4, the first window content 32 lies wholly within the second window content 34 and the window content 30 lies wholly within the first window content 32. The first window content 32 therefore includes the window content 30 and the second window content 34 therefore includes the first window content 32. The window content 30, displayed in the display window 20, is therefore a portion of the second window content 34 that has a reduced field of view compared to the second window content 34. In this example the reduced field of view is less in the horizontal direction but is the same in the vertical direction. However, this is only an example.

The first window content 32, displayed in the display window 20, is a first portion of the second window content 34 that has a reduced first field of view compared to the second window content. In this example, the first field of view is limited in the horizontal direction but not in the vertical direction. However, this is merely an example.

It will be appreciated that the first field of view for the first window content 32 is greater than the field of view for the window content 30.

In this example, but not necessarily all examples, the change in the field of view from the window content 30 to the first window content 32 has the same characteristics as a change in the field of view from the first window content 32 to the second window content 34, that is the field of view increases in the horizontal direction but not the vertical direction.

It will be appreciated from the foregoing example that more content needs to be fitted within the same display window 20 when the first change in the window content occurs displaying inside the display window 20 the first window content 32. This may, for example, be achieved by rescaling the content or by distorting the content using for example a curved projection surface.

Figure 5A:
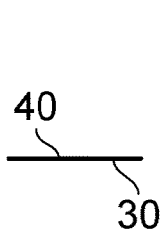
FIG. 5A illustrate a projection surface that may be used to display window content.
Figure 5B:
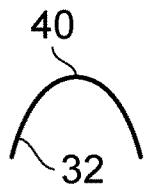
FIG. 5B illustrate a projection surface that may be used to display first window content.

FIGS. 5A and 5B illustrate different projection surfaces 40 that may be used to display window content within a display window 20. A flat or slightly curved projection may be used for displaying the window content 30 in the display window 20 and a curved projection may be used for displaying the first window content 32 in the display window 20.

Figure 5C:
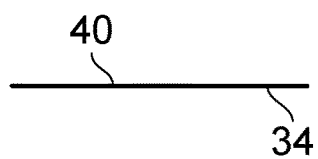
FIG. 5C illustrate a projection surfaces that may be used to display second window content.

FIGS. 5A, 5B and 5C illustrate examples of how distortion of the content may be achieved.

As illustrated in FIG. 5A, the window content 30 is rendered into the display window 20 to represent the display window 20 as a substantially flat or gently curved projection surface 40 displaying the window content 30.

As illustrated in FIG. 5B, the first window content 32 is rendered into the display window 20 to represent the display window 20 as a curved projection surface 40 displaying the first window content 32. The curvature of the curved projection surface 40 displaying the first window content 32 may be dependent upon the first user action.

The examples of distortion illustrated in FIG. 5B are those necessary to obtain a horizontal distortion without a vertical distortion. The extent of the horizontal distortion may be dependent upon the first user action, for example, the intensity of the first user action. If the intensity of the first user action increases, then the curvature of the curved projection surface 40 increases.

It will therefore be appreciated that, in this example but not necessarily all examples, the first window content 32 displayed in the display window 20 is a distortion of content comprising the window content 20 so that content in addition to the window content 20 is viewed within the display window 20 without variation to a size or resolution of the display window 20.

FIG. 5C illustrates an example in which the second window content 34 is displayed in the modified display window 22. The second window content 34 may be rendered into the modified display window 22 to represent the modified display window 22 as a substantially flat or gently curved projection surface 40 displaying the second window content 34.

Figure 6:
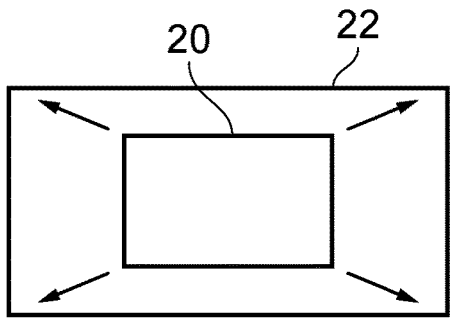
FIG. 6 illustrates an example of how the modified display window may be increase in size.

Although in FIG. 5B, and in FIG. 3C, the size of the modified display window 22 extends only horizontally relative to the display window 20, in other examples a modified display window 22 may be increased both horizontally and vertically for example as illustrated in FIG. 6.

In some, but not necessarily all, examples the window content 30 displayed in the display window 20 is a representation of virtual reality enabled content accessible for playback via at least the second user action. The representation of virtual reality enabled content may, for example, be a static image from the virtual reality enabled content or may be some other portion of the virtual reality enabled content. The first window content 32 displayed in the display window 20 is a representation of the virtual reality enabled content which may in some, but not necessarily all examples, be immediately accessible via the second user action. The second window content 34 displayed in the modified display window 22 is the virtual reality enabled content.

For example, the window content 30 displayed in the display window 20 may be a cropped portion of the virtual reality enabled content at a same scale at which the virtual reality enabled content is displayed in the modified display window 22 as second window content 34.

The first window content 32 displayed in the display window 20 is a first cropped portion of the virtual reality enabled content at a same scale at which the virtual reality enabled content is displayed in the modified display window 22 as second window content 34. The first cropped portion of virtual reality enabled content has, however, been distorted to fit into the display window 20, for example, as previously described in relation to FIG. 5B.

Figure 7A:
FIG. 7A illustrates an example of a first user action.

FIG. 7A illustrates an example of a first user action 201 performed by the user 2. In this example, the user action 201 is a user gesture. The user gesture in this example is a pointing or pushing gesture where a finger or arm is extended in a direction of the display window 20 within the virtual scene 12.

In some, but not necessarily all, examples the extent or speed of the gesture 201 may control an extent of warping or distortion of the first window content 32 within the display window 20, for example, as described in relation to FIG. 5B.

The second user action 202 may, for example, be a different gesture to that performed as the first user action 201 or it may, for example, be that the user 2 directs their gaze 202 towards the display window 20 in the virtual scene 12.

Figure 7B:
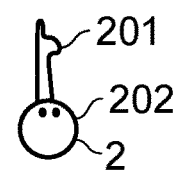
FIGS. 7B and 7C illustrate second user actions.

In the example of FIG. 7B, the second user action 202 may occur while the user is still performing the first user action 201 or the first user action is immediately followed by second user action. This may, for example, be the case where the user 2 maintains the first user action 201 to maintain the first window content 32 within the display window 20. If the first user action 201 is discontinued, then the display window 20 reverts to displaying the window content 30 until the second user action 202 is performed.

Figure 7C:
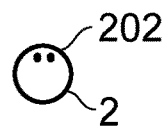

In the example of FIG. 7C, the second user action 202 is performed without the need to also perform the first user action 201 at the same time. This may be the case where the first user action 201 operates as a switch switching the window content from the window content 30 to the first window content 32 after performance of the first user action 201.

Figure 8:
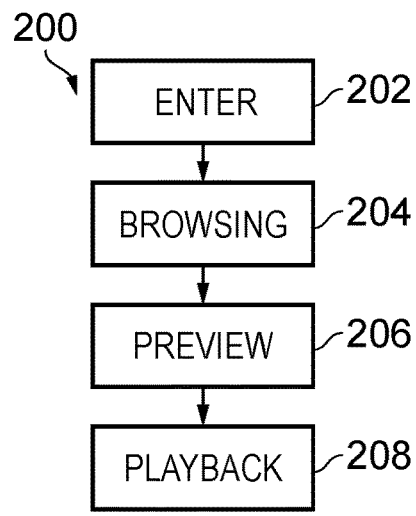
FIG. 8 illustrates an example of a method for controlling display of content in response to actions by a user.

FIG. 8 illustrates an example of a method 200 for controlling display of content in response to actions by a user.

At block 202, the method 200 enters a browsing mode.

At block 204, during the browsing mode, the method 200 detects orientation of the user so that a virtual scene 12 is changed to comprise a display window 20 comprising content representing virtual reality enabled content.

Next, at block 206, in response to a first user action 201, the method 200 causes entry to a preview mode during which the portion of the virtual reality enabled content is previewed in the display window 20.

Next, at block 208, in response to a second user action, the method 200 causes entry to a playback mode in which the virtual reality content is played.

It will be appreciated from the foregoing description that in the preview mode, in response to the first user action 201, the display window 20 is not re-sized and is kept at the same location.

In some but not necessarily all examples, in the preview mode, in response to maintenance of the first user action, increasingly larger portions of the virtual reality enabled content are previewed in the display window 20. As will be understood from the preceding description, content is warped so that it appears displayed upon a warped or curved projection surface 40. The warping or curvature of the projection surface 40 increases to enable increasingly larger portions of the virtual reality enabled content to be previewed in the display window 20.

FIGS. 9A to 9G illustrate how a projection surface 40 may be used to modify rendering of the first window content 32 within the display window 20 and to modify rendering of the second window content 34 within the modified display window 22.

The first window content 32 is projected onto the curved projection surface 40 for rendering so that when it is displayed in the display window 20 it appears that it is displayed on the curved projection surface 40. This change in the projection of the first window content 32 may be achieved by digital processing of the content.

In the example of FIG. 9A, the projection surface 40 is substantially flat, and the window content 30 is projected on to the projection surface 40 for rendering so that when it is displayed in the display window 20 it appears that it is displayed on the projection surface 40.

In the examples of FIG. 9B-9D, the projection surface 40 is increasingly curved, and the increasingly wider first window content 32 is projected on to the increasingly curved projection surface 40 for rendering so that when it is displayed in the display window 20 it appears that it is displayed on the curved projection surface 40.

As the projection surface 40 curves it defines between its end points 42 an aperture 44. The size of the aperture 44 is fixed and defined by the display window 20. Therefore, as the projection surface 40 curves more, the projection surface 40 increases in size and additional first window content 32 may be displayed, as if projected onto the curved projection surface 40, in the display window 20.

This may be achieved, by selecting first window content 32 that has a size that matches a sized of the curved projection surface 40 and then applying location-dependent scaling to the first window content 32 so that size is reduced to the size of the display window 20.

If the first window content 32 is mapped without distortion on to the projection surface 40, then the amount of scaling (compression) required for rendering a particular portion of the first window content 32 in the display window 20 is dependent upon a gradient of the projection surface 40 at the location where that particular portion of the first window content maps onto the projection surface 40.

The greater the gradient of the projection surface 40, the greater the compression that is required to compress a desired area of first window content 32 to an available area of display window 20.

It may therefore be possible, by using digital processing, to achieve the effect of projecting the first window content 32 onto a curved projection surface 40. It may also be possible to change a curvature of that projection surface 40 while displaying the first window content 32.

After the second action 202, as illustrated in FIGS. 9E to 9G, the size of the content display continues to increase and is represented by the second window content 34. However, the aperture 44 is no longer fixed and increases more rapidly than the size of the second window content 34. This results in a decreasing curvature of the projection surface 40, an increasing size of the display window, which is now the modified display window 22, and an increasing size of second window content 34.

The methods of controlling content displayed, described above, have been described in the context of a single display window within the virtual space 10. However, as described with reference to FIGS. 1A and 1B, there may be a plurality of display windows 20 distributed at different orientations in the virtual space 10 such that different virtual scenes 12 comprise combinations of one or more different display windows 20. The methods described above in relation to one display window 20 may be performed for any of the display windows 20.

For example, the method may comprise:

displaying different window content 30 inside the different display windows 20, in a displayed virtual scene 12;

in dependence upon a first user action 201, selecting one of the different display windows 20 in the displayed virtual scene 12 and causing a first change in the window content displayed inside the selected display window to first window content 32 different to the window content 30, without changing the selected display window 20; and in dependence upon a second user action 202, causing a second change in the window content displayed in the selected display window to second window content 34, different to the first window content 32 and the window content 30, and causing a variation in the selected display window to become a modified display window 22 different to the display window 20.

The above described methods may be controlled by a controller 300. Implementation of a controller 300 may be as controller circuitry. The controller 300 may be implemented in hardware alone, have certain aspects in software including firmware alone or can be a combination of hardware and software (including firmware).

As illustrated in FIG. 10 the controller 300 may be implemented using instructions that enable hardware functionality, for example, by using executable instructions of a computer program 306 in a general-purpose or special-purpose processor 302 that may be stored on a computer readable storage medium (disk, memory etc) to be executed by such a processor 302.

The processor 302 is configured to read from and write to the memory 304. The processor 302 may also comprise an output interface via which data and/or commands are output by the processor 302 and an input interface via which data and/or commands are input to the processor 302.

The memory 304 stores a computer program 306 comprising computer program instructions (computer program code) that controls the operation of the apparatus 400 (FIG. 12) when loaded into the processor 302. The computer program instructions, of the computer program 306, provide the logic and routines that enables the apparatus to perform the methods illustrated in FIGS. 1 to 9. The processor 302 by reading the memory 304 is able to load and execute the computer program 306.

The apparatus 400 illustrated in FIG. 12 therefore comprises:

at least one processor 302; and at least one memory 304 including computer program code the at least one memory 304 and the computer program code configured to, with the at least one processor 302, cause the apparatus 400 at least to perform:

causing definition of a display window 20 in a displayed virtual scene 12;

displaying window content 30 inside the display window 20, in the displayed virtual scene 12;

in dependence upon a first user action 201, causing a first change in the window content displayed inside the display window 20 to first window content 32 different to the window content 30, without changing the display window 20; and in dependence upon a second user action 202, causing a second change in the window content displayed in the display window to second window content 34, different to the first window content 32 and the window content 30, and causing a variation in the display window to become a modified display window 22 different to the display window 20.

The apparatus may be any suitable apparatus. It may, for example, be part of a virtual reality system. The virtual reality system may be configured to detect user actions, such as direction of user orientation 4, a first user action 201 such as, for example, a pointing or pushing gesture towards a display window 20, and a second user action 202 such as, for example, a direction of gaze of the user.

A direction of user orientation may be detected using an orientation detection device or means. This may, for example, be achieved by imaging the user, using a camera and orientating the user within the virtual space 10 using, for example, computer vision processing techniques and/or this may, for example, be achieved by tracking the orientation of the user using a user mounted motion detector such as a directional antenna or a gyroscope or accelerometers. These may in some but not necessarily all examples be part of a device carried by the user such as a personal electronic device such as a mobile cellular phone, personal digital assistant, electronic watch etc.

A user action may be detected using a user action detection device or means. For example, a user gesture may be detected using a user gesture detection device or means. This may, for example, be achieved by imaging the user, using a camera and recognizing gestures, for example, using computer vision processing techniques and/or may, for example, be achieved by detecting distance to a user (depth), using a depth detector and/or this may, for example, be achieved by tracking the movement of another device actuated by the user, such as for example, a joystick or controller, or device carried by the user such as a personal electronic device such as a mobile cellular phone, personal digital assistant, electronic watch etc. A depth detector may, for example, project a light pattern onto a user using for example non-visible (e.g. infrared) light and detect, using a shift in position of each image portion taken from different cameras separated in a stereoscopic arrangement, a distance of each portion of the projected pattern from the cameras. Such a depth detector is, for example, used in the Kinect™.

In some examples a direction of user orientation and a user action may be detected by the same device(s) and/or techniques. In some examples a direction of user orientation and a user action may be detected by different same device(s) and/or different techniques.

The virtual reality system may be configured to render a changing virtual scene 10 on a display 320. The display may be part of a head mounted display device. Display in this context means any means by which a user perceives visually and may include display on a screen, a near eye display or otherwise. The apparatus 400 may be a component part or parts of the virtual reality system. The apparatus 400 may be a head mounted display device. As an example, the virtual reality enabled content may be captured by one or more virtual reality cameras. The virtual reality camera may be able to capture 360-degree spherical video.

As illustrated in FIG. 11, the computer program 306 may arrive at the apparatus 400 via any suitable delivery mechanism 310. The delivery mechanism 310 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 306. The delivery mechanism may be a signal configured to reliably transfer the computer program 306. The apparatus 400 may propagate or transmit the computer program 306 as a computer data signal.

Although the memory 304 is illustrated as a single component/circuitry it may be implemented as one or more separate components/circuitry some or all of which may be integrated/removable and/or may provide permanent/semi-permanent/dynamic/cached storage.

Although the processor 302 is illustrated as a single component/circuitry it may be implemented as one or more separate components/circuitry some or all of which may be integrated/removable. The processor 302 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

The blocks illustrated in the FIGS. 1 to 9 may represent steps in a method and/or sections of code in the computer program 306. The illustration of a particular order to the blocks does not necessarily imply that there is a required or preferred order for the blocks and the order and arrangement of the block may be varied. Furthermore, it may be possible for some blocks to be omitted.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one" or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method comprising:
    causing definition of a display window in a displayed virtual scene;
    displaying first window content inside the display window, in the displayed virtual scene;
    in dependence upon a first user action, causing a first change in content displayed inside the display window to second window content different to the first window content, wherein the second window content comprises at least a portion of the first window content, without re-sizing the display window, wherein the second window content is displayed into the display window with a curvature, wherein the curvature is based, at least, on at least one dimension of the display window; and
    in dependence upon a second user action, causing a second change in content displayed in the display window to third window content, different to the first window content and the second window content, wherein the third window content comprises at least a portion of the second window content, and causing a variation in the display window to become a modified display window different to the display window.

2. A method as claimed in claim 1, wherein the first window content displayed in the display window is a representation of virtual reality enabled content accessible for playback via at least the second user action.

3. A method as claimed in claim 2, wherein the second window content displayed in the display window is a different representation of the virtual reality enabled content accessible via the second user action.

4. A method as claimed in claim 1, wherein the second window content is a distortion of visual content, comprising the first window content and the second window content, so that other content, in addition to the portion of the first window content, is viewed within the display window without variation to a size or resolution of the display window.

5. A method as claimed in claim 1, wherein the first window content is rendered into the display window to represent the display window as a substantially flat or gently curved projection surface displaying the first window content.

6. A method as claimed in claim 5, wherein the curvature of the second window content is dependent upon at least one of the first user action or at least one dimension of the second window content.

7. A method as claimed in claim 1, wherein the second change in content in response to the second user action comprises undoing the first change in content that occurred as a result of the first user action and performing a new, different, change in content, wherein the second change in content comprises continually increasing a size of the modified display window while maintaining a same content resolution for the modified display window, such that a portion of virtual reality enabled content that has an increasing field of view is displayed.

8. An apparatus comprising: at least one processor; and at least one non-transitory memory including computer program code the at least one memory and the computer program code configured to, with the at least one processor, cause the apparatus at least to perform:
    causing definition of a display window in a displayed virtual scene;
    displaying first window content inside the display window, in the displayed virtual scene;
    in dependence upon a first user action, causing a first change in content displayed inside the display window to second window content different to the first window content, wherein the second window content comprises at least a portion of the first window content, without re-sizing the display window, wherein the second window content is displayed into the display window with a curvature, wherein the curvature is based, at least, on at least one dimension of the display window; and
    in dependence upon a second user action, causing a second change in content displayed in the display window to third window content, different to the first window content and the second window content, wherein the third window comprises at least a portion of the second window content, and causing a variation in the display window to become a modified display window different to the display window.

9. The apparatus as claimed in claim 8, wherein the first window content displayed in the display window is a representation of virtual reality enabled content accessible for playback via at least the second user action.

10. The apparatus as claimed in claim 9, wherein the second window content displayed in the display window is a different representation of the virtual reality enabled content accessible via the second user action.

11. The apparatus as claimed in claim 8, wherein the second window content is dependent upon the first user action, wherein the second window content comprises all of the first window content and first additional content, and wherein the third window content comprises all of the second window content and second additional content.

12. The apparatus as claimed in claim 8, wherein the second window content is a distortion of visual content comprising the first window content and the second window content so that other content, in addition to the portion of the first window content, is viewed within the display window without variation to a size or resolution of the display window.

13. The apparatus as claimed in claim 12, wherein the distortion is applied horizontally and not vertically.

14. The apparatus as claimed in claim 8, wherein the third window content displayed in the modified display window is virtual reality enabled content.

15. The apparatus as claimed in claim 14, wherein the first window content is a portion of the virtual reality enabled content displayed in the modified display window, the second window content includes the first window content and the third window content includes the second window content.

16. The apparatus as claimed in claim 8, wherein the first window content is rendered into the display window to represent the display window as a substantially flat or gently curved projection surface displaying the first window content.

17. The apparatus as claimed in claim 16, wherein the curvature of the second window content is dependent upon at least one of the first user action or at least one dimension of the second window content.

18. The apparatus as claimed in claim 8, wherein the second change in content in response to the second user action comprises undoing the first change in content that occurred as a result of the first user action and performing a new, different, change in content, wherein the second change in content comprises continually increasing a size of the modified display window while maintaining a same content resolution for the modified display window, such that a portion of virtual reality enabled content that has an increasing field of view is displayed.

19. The apparatus as claimed in claim 8, wherein the at least one memory and the computer program code are further configured to, with the at least one processor, cause the apparatus to perform:
- defining a plurality of display windows distributed at different orientations in a virtual space such that different virtual scenes comprise combinations of one or more different display windows;
- displaying different respective window content inside one or more different display windows, in the displayed virtual scene;
- in dependence upon the first user action, selecting one of the one or more different display windows in the displayed virtual scene as the display window.

20. A non-transitory computer readable medium comprising program instructions for causing an apparatus to perform at least the following:
- causing definition of a display window in a displayed virtual scene;
- displaying first window content inside the display window, in the displayed virtual scene;
- in dependence upon a first user action, causing a first change in content displayed inside the display window to second window content different to the first window content, wherein the second window content comprises at least a portion of the first window content, without re-sizing the display window, wherein the second window content is displayed into the display window with a curvature, wherein the curvature is based, at least, on at least one dimension of the display window; and
- in dependence upon a second user action, causing a second change in content displayed in the display window to third window content, different to the first window content and the second window content, wherein the third window content comprises at least a portion of the second window content, and causing a variation in the display window to become a modified display window different to the display window.

* * * * *